July 12, 1966 E. W. HARANT 3,260,464
GARDEN CHEMICAL SOLUTION METERING DEVICE
Filed Oct. 18, 1963 2 Sheets-Sheet 1
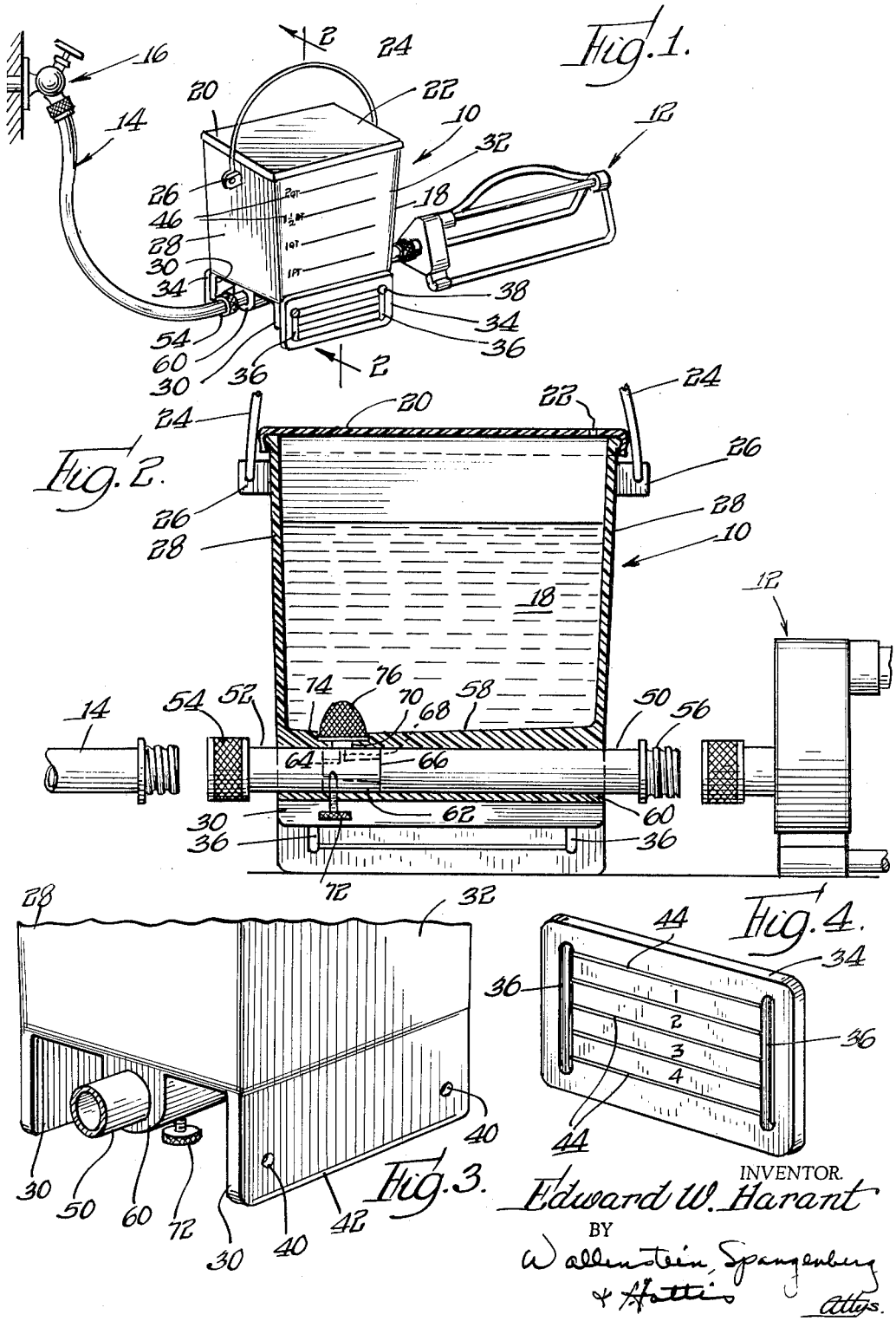
INVENTOR.
Edward W. Harant
BY
Wallenstein, Spangenberg
& Hattis
Attys.

July 12, 1966     E. W. HARANT     3,260,464
GARDEN CHEMICAL SOLUTION METERING DEVICE
Filed Oct. 18, 1963     2 Sheets-Sheet 2
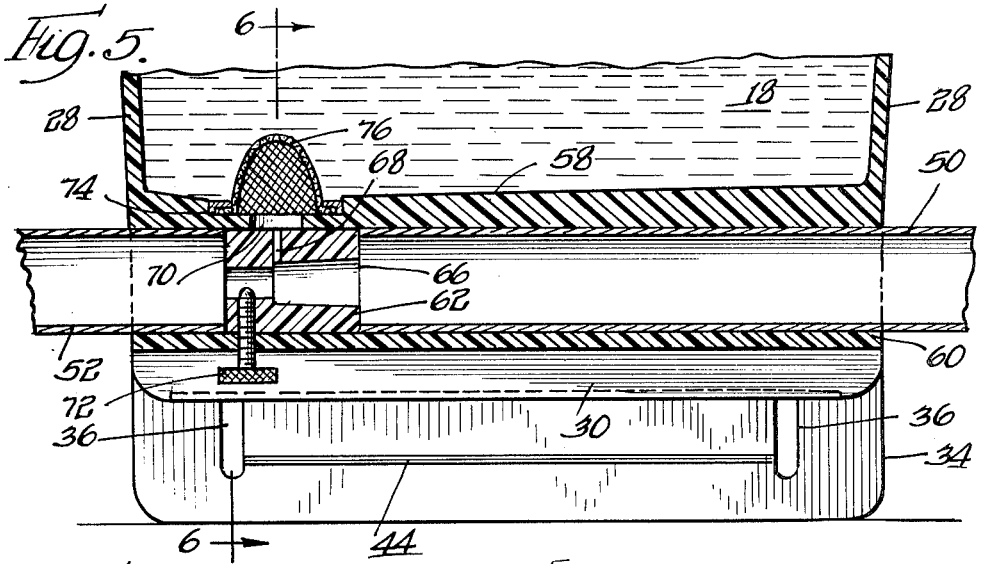
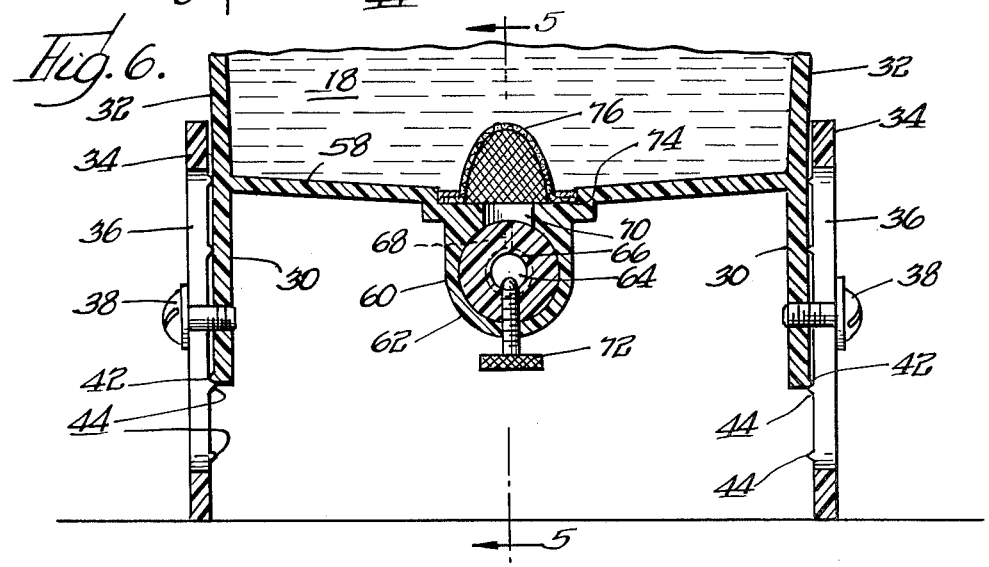
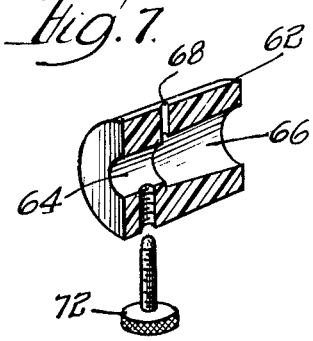
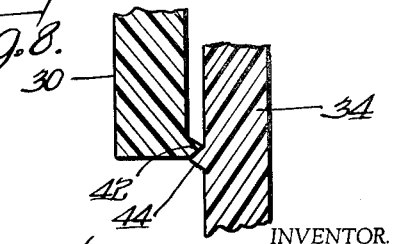
INVENTOR.
Edward W. Harant United States Patent Office 3,260,464
Patented July 12, 1966

3,260,464
GARDEN CHEMICAL SOLUTION METERING
DEVICE
Edward W. Harant, 3251 N. Olcott Ave., Chicago, Ill.
Filed Oct. 18, 1963, Ser. No. 317,166
6 Claims. (Cl. 239—318)

This invention relates to a self-supporting, portable device for attachment to a lawn sprinkler for effecting the entrainment of a solution of a garden chemical in a carrier liquid flowing to the lawn sprinkler from a source thereof.

There are a number of devices for distributing a solution of a garden chemical on plants, lawns, and the like. In the main, such devices are of the hand held sprayer type and take the form of either a portable tank equipped with a pump and an associated spray nozzle unit, or a spray dispensing nozzle which is attachable to a garden hose and to a receptacle containing a solution of a garden chemical, and which, by means of a Venturi generated suction or entrainment action of a metering element within the spray device carrying the water stream, draws the solution from the receptacle into the water stream.

Such conventional devices, apart from the fact that they must be held by the user throughout the spraying operation, are dependent upon the movements of the user to obtain an adequate distribution of the garden chemical solution. Generally speaking, such movements are erratic and are conducive to the distribution of either too little, or too much, of the garden chemical solution on the plant life at which the spray is directed.

It is an object of the present invention to provide a self-supporting garden chemical solution metering device for connection to a lawn sprinkler which can be easily and readily moved, with the sprinkler attached, to any desired location in an area to which the garden chemical is to be applied, and which takes advantage of the uniform movement of the sprinkler to attain adequate and thorough distribution of the garden chemical solution.

It is also an object of the present invention to provide a self-supporting garden chemical solution metering device which is connectible directly to a wide variety of lawn sprinklers, and which, irrespective of the capacity and flow characteristics of the particular sprinkler, enables substantially uniform and thorough distribution of a garden chemical through the sprinkler.

Briefly, the self-supporting garden chemical solution metering device of the present invention has a pail-like receptacle for holding a solution of a garden chemical. The receptacle at its base advantageously carries a horizontally extending open-ended conduit having a longitudinal carrier liquid passageway. The inlet end of the conduit is connectible to a line such as a garden hose through which a carrier liquid is caused to flow, and the outlet end of the conduit is connectible directly to a lawn sprinkler. A metering member or element is positioned in the longitudinal carrier liquid passageway of the conduit which, in cooperation with means associated therewith, provides a pressure drop at a given point therein, irrespective of the capacity and flow characteristics of the sprinkler to which the device of the present invention is connected. The metering member or element desirably has a narrow, transverse garden chemical solution delivery passageway communicating with the garden chemical solution in the receptacle and intersecting the point in the metering member or element at which the pressure drop is caused to occur. The receptacle has a handle permitting it to be easily and conveniently moved, together with an attached sprinkler, to any desired location in an area being sprinkled. To enable the conduit of the device of the present invention to be aligned properly with the inlet of substantially any commercially available lawn sprinkler and thus permit both the device and the sprinkler to rest firmly on a supporting surface, the device advantageously is provided with vertically adjustable supporting side members.

Other objects, advantages and features of the invention will become apparent upon making reference to the specification to follow, the claims and drawings wherein:

FIG. 1 is a view in perspective of an embodiment of the self-supporting garden chemical solution metering device of the present invention illustrating the device as used;

FIG. 2 is a fragmentary vertical partly exploded sectional view taken substantially along line 2—2 of FIG. 1;

FIG. 3 is a fragmentary view in perspective of the embodiment of the device illustrated in FIG. 1 showing the garden hose connectible end of the device;

FIG. 4 is a view in perspective of one of the adjustable supporting side members of the device illustrated in FIG. 1;

FIG. 5 is an enlarged fragmentary longitudinal vertical sectional view of the embodiment of the device shown in FIG. 1;

FIG. 6 is a vertical sectional view taken substantially along line 6—6 of FIG. 5;

FIG. 7 is an enlarged exploded perspective view partly in section showing the metering member or element and its associated carrier liquid volume control; and FIG. 8 is an enlarged fragmentary vertical sectional view showing the ribs or side extensions on the side walls of the receptacle and the adjustable supporting side members in operative engagement.

Referring now to the drawings which illustrate a preferred embodiment of the invention, the self-supporting garden chemical solution metering device, designated generally at 10, is shown in FIG. 1 interposed between a lawn sprinkler 12 and a line such as garden hose 14 through which a carrier liquid under variable pressure is caused to flow from a hydrant 16. The device 10 includes a four sided, pail-like receptacle 18, which advantageously is fabricated of a durable, lightweight, transparent, corrosive-resistant plastic, for holding a solution of a garden chemical such as a fertilizer, fungicide, insecticide, and the like. The receptacle has an open top which desirably is provided with a cover 20 having one or more ports or atmospheric vents 22. To facilitate transporting the device alone, or with the sprinkler attached as illustrated, a handle 24 is provided which is secured to ears or extensions 26 in the end walls 28 of the receptacle 18.

Ground level support for the receptacle 18 advantageously is provided by support portions 30 depending from side walls 32 of the receptacle. In the preferred embodiment of the invention illustrated, the receptacle 18 can be vertically adjusted with respect to the inlet of a lawn sprinkler such as sprinkler 12 by provision of separate adjustable supporting side members 34. The supporting side members 34 desirably have spaced vertical slots 36 each of which receives a bolt 38. The bolts 38 extend through correspondingly spaced holes 40 in the downwardly extending support portions 30 of the receptacle. The holes 40 may be threaded, or nuts may be provided for the bolts, for securely maintaining the side members 34 in the preselected position with respect to the depending support portions 30. To prevent slippage occurring between the side members 34 and the support portions 30 due to jarring of the receptacle 18, the outer face of the support portions 30, near the base thereof, advantageously has a horizontally extending rib or ridge 42 which cooperates with a preselected one of a plurality of vertically spaced horizontally extending ribs or ridges 44 on the inner face of the separate side members 34 between the slots 36 thereof. As clearly shown in FIG. 8, the upper surface of the rib or ridge 44 on the side member 34 engages the bottom surface of the rib or ridge 42 on the support portion 30 of the receptacle 18. With this arrangement, the possibility of movement of the side members 34 relative to the support portions 30 from their selected adjusted position is substantially lessened.

The receptacle 18 desirably is provided with suitable indicia 46 on one or both of the side walls 32 for indicating the volume of garden chemical solution contained therein at any particular time, the receptacle preferably being transparent or translucent to permit the upper level of the garden chemical solution in the receptacle to be ascertainable from the outside thereof. Such indicia can also be helpful in preparing the garden chemical solution to be distributed on plant life to assure that proper proportions of chemical and diluent are utilized.

In achieving the objectives of the present invention, the receptacle 18 advantageously carries at its base a horizontally extending, open-ended carrier liquid conduit 50 having an inlet end 52 provided with a threaded swivel coupling 54 for attachment to a garden hose 14, and a threaded outlet end 56 for engaging with a correspondingly threaded swivel coupling on a lawn sprinkler 12. The walls of the conduit 50 define a longitudinal carrier liquid passageway and the open ends thereof extend well beyond the end walls 28 of the receptacle to facilitate connection thereof to a hose and sprinkler. The conduit 50 desirably is held securely in position substantially intermediate the side walls 32 of the receptacle 18 adjacent the bottom wall 58 thereof by downwardly extending ears 60 which conveniently are formed from and continuous with the material of which the end walls 28 are fabricated.

Secured, as by press-fitting, longitudinally within the conduit 50, proximal to the inlet end 52 thereof, is a metering member or element 62. The metering element 62 has a series of axially aligned liquid conducting passages which, as will be made clear as the description proceeds, function to provide an entrainment or reduced pressure or venturi action necessary to effect withdrawal of the garden chemical solution in the receptacle 18 into the water stream coursing through the conduit 50. The inlet or upstream passage 64 of the metering element 62 may be of substantially uniform cross-section and merges or connects with a second passage 66 of tapering cross-section. The walls defining the passage 66 diverge in a downstream direction, and the area thereof of least diameter is greater than the diameter of the passage 64. At the juncture of the passage 64 with the passage 66, the metering element 62 advantageously is provided with a narrow, transverse intersecting passageway 68 or very small cross-section communicating with the solution in the receptacle 18 through an opening 70 in the bottom wall 58 thereof.

As indicated hereinabove, the garden chemical solution metering device of the present invention is connectible to a wide variety of lawn sprinklers, and will enable distribution of a garden chemical solution therethrough irrespective of the capacity and flow characteristics of the particular sprinkler. Generally speaking, water enters a sprinkler through a hose-connected inlet of substantially the same diameter as the garden hose but leaves the sprinkler through a series of restricted, water-distributing orifices. This action of the sprinkler tends to develop back pressures in the water line upstream of the sprinkler. In the absence of such back pressures, water passing through the axially aligned passageways of the metering element 62, normally, would produce a pressure drop at the juncture of the passage 64 with the passage 66 sufficient to permit garden chemical solution to pass from the receptacle 18 through the transverse passageway 68 into the water stream. However, in the usual situation, the back pressures resulting from the sprinkler substantially prevent, or at least materially impede, the development of the desired pressure differential at the juncture of the passages 64 and 66 to enable entrainment of the garden chemical solution in the carrier fluid stream.

The metering device of the present invention is provided with unique means for achieving and maintaining a pressure drop in the metering member or element 62 whereby stoppage of flow of garden chemical solution from the receptacle 18 through the passageway 68 into the carrier fluid stream, resulting from back pressures in the carrier fluid upstream of the sprinkler, is eliminated. In the embodiment of the invention illustrated, means for achieving this end conveniently takes the form of a knurl-headed spherical tipped set screw 72 positioned upstream from the point in the metering element 62 at which the pressure drop would normally occur. The screw 72 advantageously is selectively adjustable in a direction transverse to the flow of carrier fluid into the conduit 50 and attains the desired pressure drop in the metering element 62 by movement into the passage 64 thereof. Movement of the screw 72 into the passage 64 acts to reduce the cross-sectional area of a portion of the passage at a point upstream of and adjacent to the juncture of the axially aligned passageways of the metering element 62. This has the effect of increasing the rate or speed of flow of the carrier fluid past the transverse passageway 68 resulting in a pressure drop sufficient to bring about entrainment of garden chemical solution in the carrier fluid stream. The extent to which the screw will be moved into the passage 64 will be dependent upon the capacity and flow characteristics of the particular sprinkler to which the metering device of the present invention is attached. The dimensions of the screw 72 are such that flow of carrier fluid through the passage 64 into the passage 66 is never cut-off. By permitting control of the rate or speed of flow of carrier fluid in the manner described, back pressure conditions produced by the action of the sprinkler which tend to stop passage of garden chemical solution into the carrier fluid stream are overcome. Thus effective distribution of a substantially constant proportionate mixture of the garden chemical solution and carrier fluid flowing to a lawn sprinkler is attained under substantially all pressure variations in the carrier fluid stream.

In the embodiment of the metering member or element 62 illustrated in the drawing, the element 62 is substantially cylindrical in shape and has an overall length of about one inch and a diameter of approximately 0.705 inch. The dimensions of the passage 64 of the element 62 and the screw 72 play an important role in attaining and maintaining the conditions necessary in the element 62 for effecting entrainment of the garden chemical solution into the carrier fluid stream. In the embodiment illustrated, the length of the passage 64 is approximately 0.344 inch while the diameter thereof is approximately 0.187 inch. The screw 72, on the other hand, has a diameter of approximately 0.313 inch and a length such that the spherical head thereof will not make contact with the opposite wall of the passage 64. The tapered passage 66 of the element 62, at its juncture with the passage 64 has a diameter of approximately 0.400 inch and the outlet end thereof has a diameter of approximately 0.531 inch. It is to be understood, of course, that the dimensions of the element 62, the passageways therein, and the screw 72, as described, may be varied within reasonable limits without appreciably affecting the operation of the metering device. Thus, for example, the diameter of the passage 64 may range from approximately 0.124 inch to approximately 0.195 inch, while the diameter of the screw 72 may vary from approximately 0.255 inch to approximately 0.400 inch. The dimensions herein set out are given by way of illustrating a preferred embodiment of the invention and are not to be construed as limitative of the broader aspects thereof.

To assure that all of the garden chemical solution in the receptacle 18 is entrained in the carrier fluid stream, the bottom wall 58 is troughed toward an opening 70 therein. The opening 70 at its inlet end desirably is provided with an annular depression or ledge 74 of greater diameter than the opening 70 for receiving a sediment screen 76 to prevent clogging of the passage 68.

In utilizing the device of the present invention, the outlet end 56 of the conduit 50 is connected to a lawn sprinkler 12 as shown in FIG. 1. The inlet end 52 of the conduit 50 is then attached to a garden hose 14 which, in turn, is connected to a source of water. If the device requires adjustment to align the outlet of the conduit 50 with the inlet of the sprinkler to assure that both the device and the sprinkler will rest firmly on a lawn surface, for example, this can be accomplished by proper adjustment of the side members 34 in the manner hereinabove described. The receptacle 18 of the device is then filled to the desired level with a garden chemical solution and the cover 20 replaced thereon to prevent, among other things, foreign matter such as leaves from falling into the receptacle. Water is allowed to flow into the device and to the sprinkler. In the event, due either to the capacity or flow characteristics of the sprinkler, garden chemical solution is not passing into the carrier fluid stream, it is merely necessary to adjust the screw 72 upwardly to bring this about. Thereafter, the sprinkler may be permitted to operate as long as desired to achieve the proper distribution of the garden chemical solution. The uniform action of the sprinkler assures an even and thorough distribution of garden chemical solution on all areas to be covered. The device and the sprinkler may be readily and conveniently moved when necessary by merely grasping the handle 24 of the device.

The present invention thus provides an exceedingly effective, efficient and easy means for applying a garden chemical solution to a lawn or the like. Its simple, lightweight design makes it inexpensive to manufacture. Other advantages of the device of this invention will suggest themselves to those in the art.

It should be understood that numerous modifications may be made in the preferred form of the invention above described without deviating from the broader aspects of the invention.

What is claimed is:

1. A self-supporting garden chemical solution metering device for connection between a lawn sprinkler and a line through which a carrier fluid under variable pressure is caused to flow comprising: a pail-like receptacle for holding a garden chemical solution, a horizontally extending carrier fluid conduit secured externally of the receptacle below and adjacent to the bottom wall of the receptacle, said conduit having an inlet end connectible to a line through which a carrier fluid is caused to flow and an outlet end connectible to the inlet of a lawn sprinkler, means in said conduit having a passageway in communication with the garden chemical solution in the receptacle and the carrier fluid stream to effect entrainment of the garden chemical solution in the carrier fluid, and carrier fluid velocity control means adjustable with respect to said first mentioned means for regulating the velocity of flow of fluid through said first mentioned means in a manner to assure entrainment of the garden chemical solution in the carrier fluid stream irrespective of the capacity and flow characteristics of the sprinkler, said carrier fluid velocity control means being incapable of cutting off completely the flow of carrier fluid through said conduit.

2. In combination, a lawn sprinkler and a self-supporting garden chemical solution metering device for connection between the lawn sprinkler and a line through which a carrier fluid under variable pressure is caused to flow, said metering device comprising a receptacle for holding a garden chemical solution having a horizontally extending carrier fluid conduit secured externally of the receptacle below and adjacent to the bottom wall thereof, said conduit having an inlet end connectible to a line through which a carrier fluid is caused to flow and an outlet end connected to the lawn sprinkler, means in said conduit having a passageway in communication with the garden chemical solution in the receptacle and the carrier fluid stream to effect entrainment of the garden chemical solution in the carrier fluid, carrier fluid velocity control means adjustable with respect to said first mentioned means for regulating the velocity of flow of fluid through said first mentioned means in a manner to assure entrainment of the garden chemical solution in the carrier fluid stream irrespective of the capacity and flow characteristics of the sprinkler, said carrier fluid velocity control means being incapable of cutting off completely the flow of carrier fluid through said conduit, and a handle for said receptacle to permit the receptacle and the sprinkler to be moved as a unit to any desired location in an area where distribution of the garden chemical solution is to be effected.

3. A self-supporting garden chemical solution metering device for direct connection to a wide variety of lawn sprinklers having different capacity and flow characteristics, comprising: a receptacle for a concentrated solution of a garden chemical, a horizontally extending open-ended conduit secured to the base of said receptacle externally thereof, said conduit having a longitudinal carrier fluid passageway therein the inlet end of which is connectible to a line through which a carrier fluid is caused to flow and the outlet end of which is connectible directly to a lawn sprinkler, metering means in said longitudinal carrier fluid passageway having a longitudinal fluid velocity increasing passageway for providing a pressure drop at a given point therein, an upper garden chemical solution inlet passage in said metering means communicating with the point at which the pressure drop occurs in the longitudinal fluid velocity increasing passageway therein for carrying a chemical solution from said receptacle to said pressure drop point, and carrier fluid velocity control means carried by said metering means upstream from said pressure drop point for selectively regulating the velocity of flow of carrier fluid flowing through said metering means in a manner to maintain a pressure drop at said point irrespective of the capacity and flow characteristics of the lawn sprinkler to assure entrainment of the garden chemical solution in carrier fluid flowing through said longitudinal carrier fluid passageway to the lawn sprinkler, said carrier fluid velocity control means being incapable of cutting off completely the flow of carrier fluid through said conduit.

4. A self-supporting garden chemical solution metering device for direct connection to a wide variety of lawn sprinklers having different capacity and flow characteristics, comprising: a horizontally extending open-ended conduit having a longitudinal carrier fluid passageway therein, the inlet end of said carrier fluid passageway being connectible to a line through which a carrier fluid is caused to flow, the outlet end of said carrier fluid passageway being connectible directly to a lawn sprinkler, a metering member in said longitudinal carrier fluid passageway having a series of passageways therein substantially axially aligned with said longitudinal carrier fluid passageway for providing a pressure drop at a given point therein, a garden chemical solution inlet pasageway in said metering member transverse to said series of axially aligned passageways communicating with the point at which the pressure drop occurs in said metering member for carrying a chemical solution to said metering member from a source thereof, and adjustable means carried by said metering member upstream from said pressure drop point and transversely disposed with respect to said axially aligned passageways for selectively regulating the velocity of flow of carrier fluid flowing through said metering means in a manner to maintain a pressure drop at said point irrespective of the capacity and flow characteristics of the lawn sprinkler to assure entrainment of the garden chemical solution in a carrier fluid flowing through said longitudinal carrier fluid passageway to the lawn sprinkler, said carrier fluid velocity control means being incapable of cutting off completely the flow of carrier fluid through said conduit.

5. A self-supporting garden chemical solution metering device for direct connection to a wide variety of lawn sprinklers having different capacity and flow characteristics, comprising: a receptacle for a concentrated solution of a garden chemical, said receptacle having vertically adjustable supporting side members, a horizontally extending open-ended conduit secured to the base of said receptacle externally thereof, said conduit having a longitudinal carrier fluid passageway therein the inlet end of which is connectible to a line through which a carrier fluid is caused to flow and the outlet end of which is connectible directly to a lawn sprinkler, a metering member in said longitudinal carrier fluid passageway having two joined longitudinal fluid velocity increasing passageways in substantial axial alignment with said longitudinal carrier fluid delivery passageway in said conduit, an upper narrow, transverse, garden chemical solution passageway communicating with the garden chemical solution in said receptacle and intersecting a low pressure point at the juncture of the two connected longitudinal fluid velocity increasing passageways in said metering member, and a carrier fluid velocity flow control member carried by said metering element upstream from said low pressure point for selectively regulating the velocity of flow of carrier fluid flowing through said metering member in a manner to maintain a pressure drop at said low pressure point irrespective of the capacity and flow characteristics of the lawn sprinkler to assure the entrainment of the garden chemical solution in a carrier fluid flowing through said longitudin